G. L. YOUNG.
FRYING APPARATUS.
APPLICATION FILED DEC. 13, 1917.

1,264,740.

Patented Apr. 30, 1918.

Inventor:
George L. Young
by his attorney

UNITED STATES PATENT OFFICE.

GEORGE L. YOUNG, OF CAMBRIDGE, MASSACHUSETTS.

FRYING APPARATUS.

1,264,740.　　　　　Specification of Letters Patent.　　Patented Apr. 30, 1918.

Application filed December 13, 1917.　Serial No. 206,923.

*To all whom it may concern:*

Be it known that I, GEORGE L. YOUNG, a citizen of the United States, and a resident of Cambridge, in the county of Middlesex and State of Massachusetts, have invented a new and useful Improvement in Frying Apparatus, of which the following is a specification.

My invention relates to frying apparatus designed for cooking food in grease, oils, etc., and its object is to provide a device whereby the flavor of the food cooked will not be imparted to the cooking-medium so that the latter may if desired be used successively for different kinds of food.

In carrying out my invention I employ a container for the cooking-medium which is provided with a depending extension so that the particles of the food cooked will fall into said extension and will not therefore be subjected to the high temperature of the medium in the upper part of the container which is heated by any suitable means located above said extension.

I have demonstrated in practice when the sediment from the food is maintained at a temperature lower than that of the cooking-medium in the upper part of the container and is not subjected to the direct action of the heater, the oil or other cooking-medium is maintained in a pure state and does not receive the flavor of the food.

My invention will be described by reference to the accompanying drawings in which—

Figure 1:
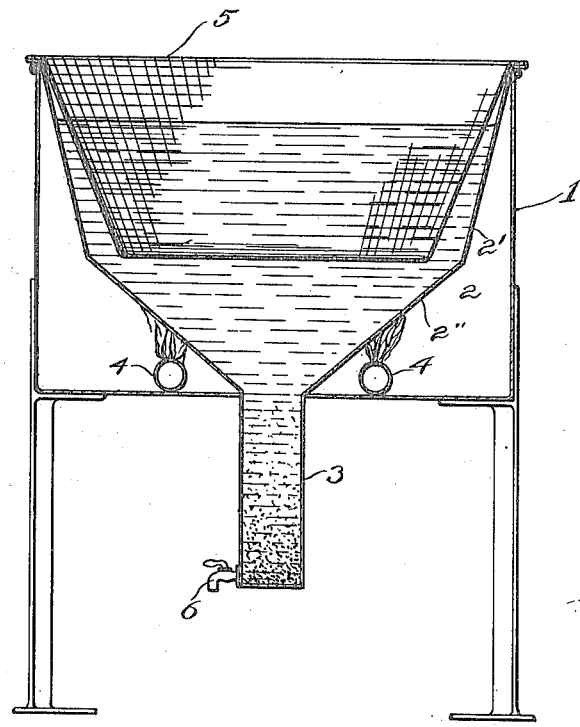
Figure 2:
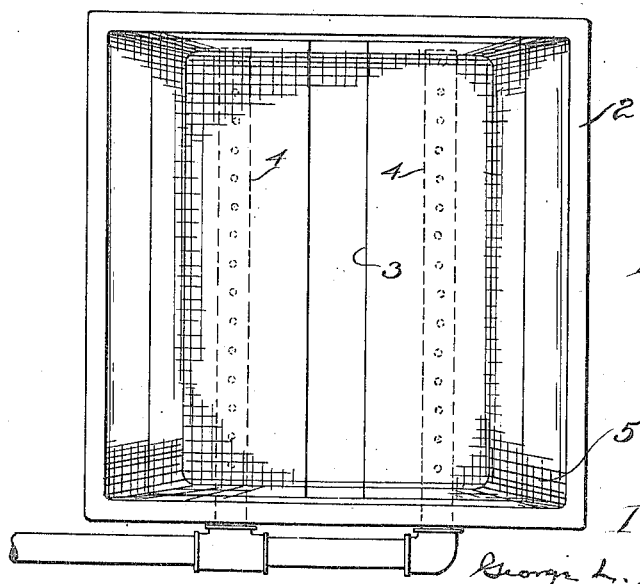

Figure 1 is a vertical section of my improved frying apparatus and Fig. 2 is a plan view thereof.

In the particular drawings selected for more fully disclosing my invention 1 is a casing which may be of any suitable shape although herein shown as square, and preferably said casing is constructed of heat insulating material. Placed within said casing is a container 2 for the cooking-medium, said container being provided with sloping sides 2', 2'', although it will be understood that the container may have any suitable shape which will permit the particles of food which fall therein to eventually find their way into the extension 3 which in the present instance is shown as a trough depending from the bottom of the container and projecting through an aperture in the base of the casing.

Arranged above said extension and preferably coöperating with the slanting sides 2'' of the container is a heating device, herein shown as a gas heater consisting of two pipes 4, 4 which extend throughout the length of the container. It will be understood of course that I do not limit myself to a gas heater and that an electrical heating device or a heater of any other type may be employed.

Placed within the container is a receptacle for holding the food to be cooked, said receptacle being shown in the present instance as a frying basket 5.

If desired the lower end of the depending extension 3 may be provided with a cock 6 whereby any water that cooks out of the food and which will of course fall to the bottom of the extension may be drawn off.

In the process of frying food such as fish cakes, doughnuts, etc., in the oil or grease which fills the container 3, particles of food will become detached and fall into the extension which being located some distance below the point or points at which the heat is applied to the container will be maintained at a relatively low temperature. After a period of use the extension will become filled with the sediment which drops from the food whereupon the container may be removed, the trough emptied and cleaned, and the apparatus placed in condition for further use.

It will be understood that various modifications may be made in the size, form and proportions of the apparatus herein particularly described without departing from the principle of my invention which involves a construction wherein the food sediment is maintained at a lower temperature than that portion of the cooking-medium with which the food is in direct contact.

Having thus described one specific embodiment of my invention without however limiting the same thereto, what I claim is:

1. Frying apparatus, comprising in combination a cooking-medium container provided with a depending extension, and means for applying heat to the cooking-medium above said extension whereby the sediment from the food which falls into said extension is maintained at a lower temperature than the cooking-medium in the upper part of the container.

2. Frying apparatus, comprising in combination a heat-insulating casing, a cooking-medium container located within said casing and provided with a depending extension, and heating means within said casing and located above said extension.

3. Frying apparatus, comprising in combination a cooking-medium container having sloping sides and terminating in a trough, and means for heating the contents of said container, said means being located above said trough.

4. Frying apparatus, comprising in combination a cooking-medium container provided with a depending extension, a frying basket in said container, and means for applying heat to the cooking-medium above said extension.

5. Frying apparatus, comprising in combination a casing, a cooking-medium container having sloping sides and terminating in a trough, said container being placed within said casing, a frying basket in said container, and a heater located in proximity to the sloping sides of said container.

In testimony whereof, I have hereunto subscribed my name this 10th day of December, 1917.

GEORGE L. YOUNG.